UNITED STATES PATENT OFFICE.

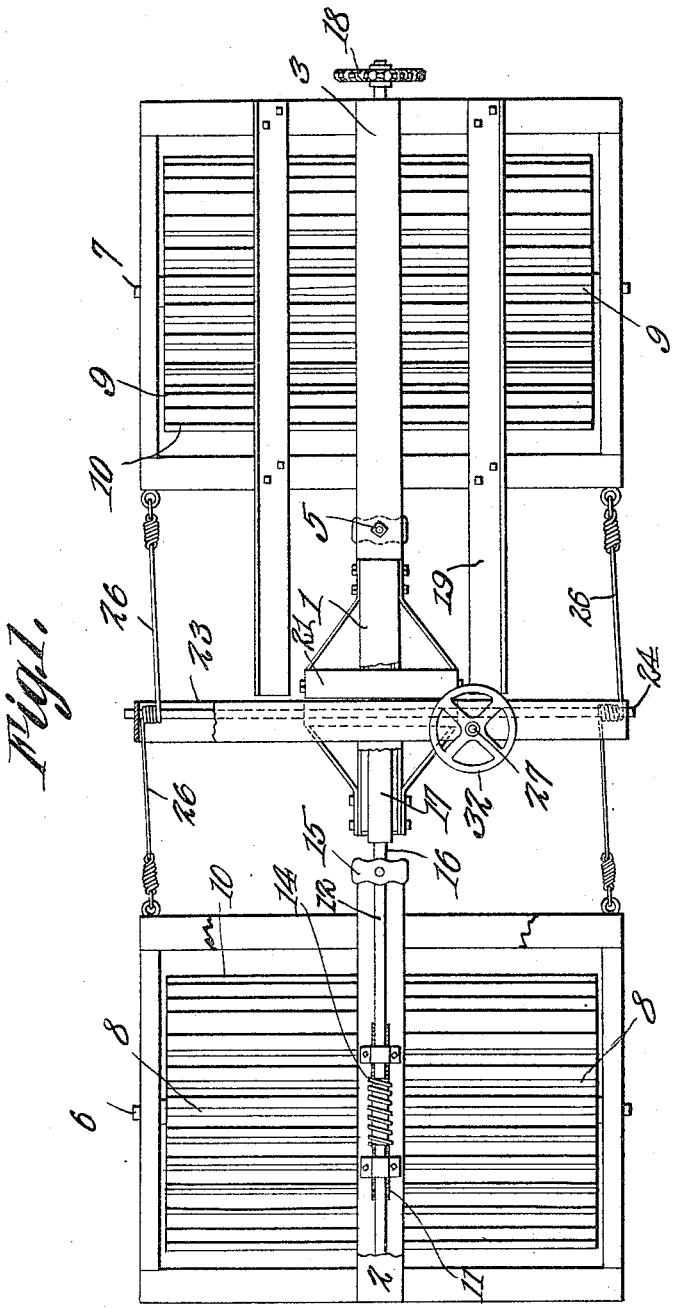

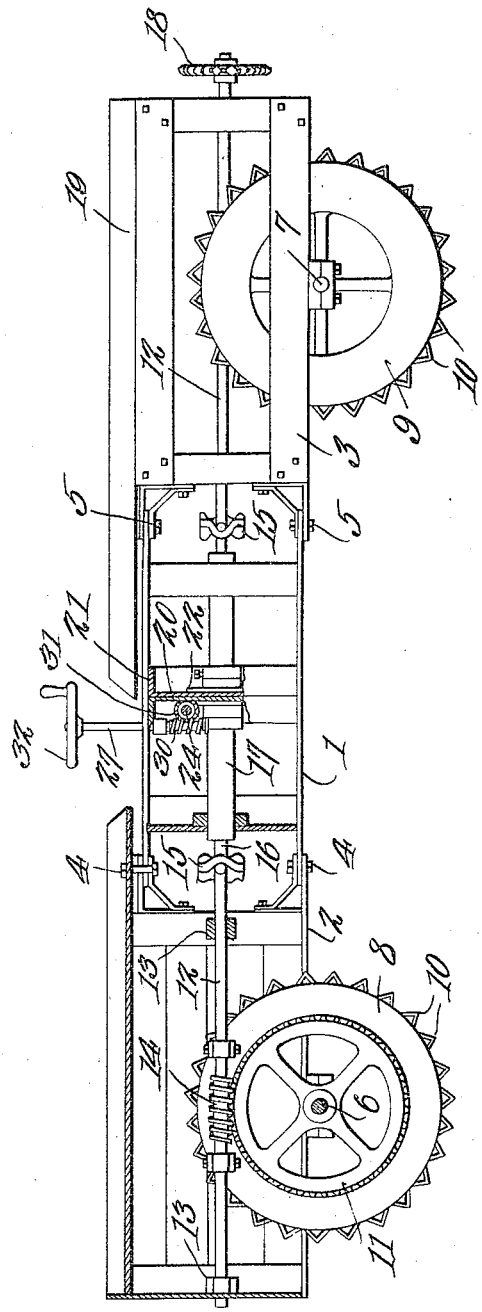

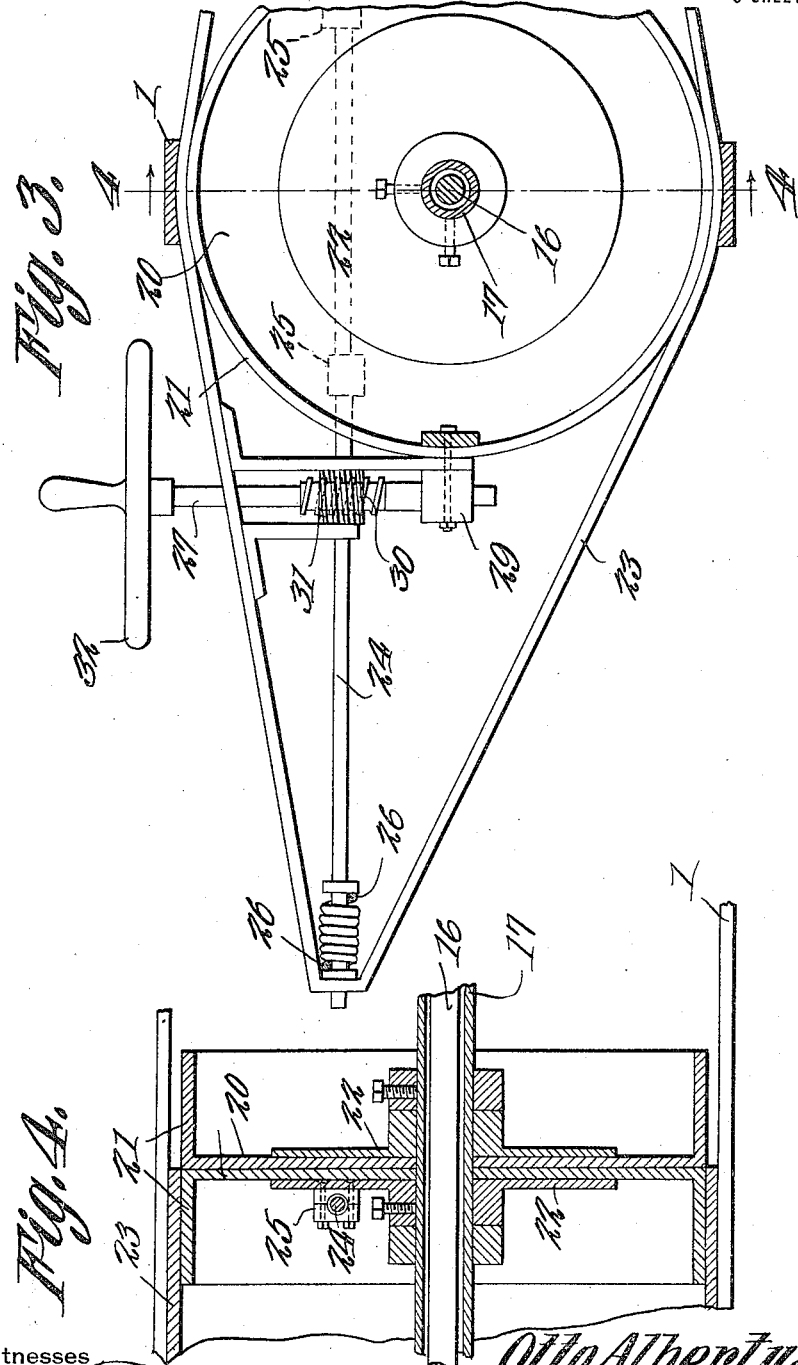

OTTO ALBERTUS, OF DOLAND, SOUTH DAKOTA.

TRACTOR.

1,182,883. Specification of Letters Patent. Patented May 16, 1916.

Application filed April 30, 1915. Serial No. 25,013.

*To all whom it may concern:*

Be it known that I, OTTO ALBERTUS, a citizen of the United States, residing at Doland, in the county of Spink and State of South Dakota, have invented a new and useful Tractor, of which the following is a specification.

The present invention appertains to tractors, and aims to provide a novel and improved machine of that character.

It is the object of the invention to provide a tractor which is adapted for agricultural and similar purposes, and which is of unique construction and operation to that end, whereby the tractor is operable in an efficient manner upon plowed or soft soil as well as upon roads.

It is also the object of the invention to provide a tractor having its front and rear wheels adapted to be driven for effectively propelling the machine, and furthermore, to enable the front and rear wheels to be swung for conveniently and effectively steering the machine.

A further object of the invention is the provision of a tractor having the features above noted, and which at the same time, is comparatively simple and inexpensive in construction, as well as being thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:—

Figure 1 is a plan view of the improved tractor, portions being broken away. Fig. 2 is a side elevation of the machine, portions being broken away. Fig. 3 is an enlarged fragmental view of the central or main frame, illustrating a portion of the steering mechanism. Fig. 4 is a sectional view taken on the line 4—4 of Fig. 3.

In carrying out the invention, the body of the tractor embodies a central or main frame 1, and forward and rear end frames 2 and 3, respectively which are hinged or pivoted to the frame 1 to swing about vertical axes. The rear end of the forward frame 2 is connected by means of upper and lower pivots 4 to the forward end of the frame 1 and the forward end of the rear frame 3 is connected by similar pivots 5 to the rear end of the frame 1. In this manner, the frames 2 and 3 may swing horizontally relative to the central frame 1.

The front axle 6 is journaled in any suitable manner to the frame 2 and a rear axle 7 is journaled in a suitable manner to the frame 3, the axles being disposed between the ends of the respective frames. A pair of relatively wide ground wheels 8 are mounted upon the axle 6, and a pair of relatively wide ground wheels 9 are mounted upon the axle 7. Each pair of wheels provides a roller which may readily run upon plowed or soft soil as well as upon a solid road bed, and which is particularly desired when the tractor is used for agricultural purposes. Each of the wheels has transverse angle members 10 secured upon its tire or periphery, to increase the tractive effort of the wheels materially.

A worm wheel 11 is secured upon each axle between the respective wheels, and a longitudinal shaft 12 is journaled to each of the end frames, the end frames being provided with suitable bearings 13 for the shafts 12. The shafts 12 are disposed between wheels of the respective pairs and a worm 14 is secured upon each shaft 12 and intermeshes with the companion worm wheel 11. The adjacent ends of the shafts 12 are connected by means of universal joints 15 with the ends of a central or intermediate shaft 16 journaled through a tubular housing 17 carried by the central frame 1. The universal joints 15 lie in the lines connecting the respective pivots 4 and 5, or it may be said that the universal joints lie in the axes of the hinges or pivots connecting the three frames of the body. It may also be noted, at this point, that the frames 1, 2 and 3 may be constructed of angle and channel iron, or any other suitable material.

The rear end of the rear shaft 12 is provided with a sprocket wheel 18 which may be connected to an internal combustion engine or prime mover (not shown) carried by the frame 3, the frame 3 having upper angle irons or members 19 for the attachment of an engine or motor thereon.

The central frame 1 includes a pair of circular plates 20 between the ends of the frame 1 and having the annular flanges 21 which project away from one another, and a pair of disks 22 are mounted upon the intermediate portion of the housing 17 and bear against the plates 20 for holding the shaft 17 in proper position. The frame 1 also includes a transverse bar or member 23 of approximately diamond-shape, the intermediate portion of the member 23 being secured upon one of the flanges 21.

A transverse shaft 24 is terminally journaled through the ends of the member 23, and through suitable bearings 25 attached to one of the plates 20, and two pairs of cables 26 are attached to the adjacent ends of the frames 2 and 3 adjacent the sides of the said frames, and the cables 26 are wound upon the end portions of the shaft 24, whereby the end portions of the said shaft provide reels or drums for the cables.

An upright steering post or shaft 27 is journaled through the upper portion of the member 23 at one side of the plates 20, and the lower end of the steering shaft 27 is journaled to a bearing 29 attached to one side of one of the flanges 21. A worm 30 is carried by the shaft 27 and intermeshes with a worm wheel 31 keyed upon the shaft 24. The shaft 27 has a hand wheel 32 at its upper end whereby the operator may conveniently rotate the steering shaft or post 27.

In operation, when the rear shaft 12 is rotated, the shaft 16 will cause the forward shaft 12 to be rotated also, and the worms 14 in being rotated and engaging the worm wheels 11, will rotate the axles 6 and 7, and as a result the wheels 8 and 9 will be forcibly driven for propelling the machine in an effective manner. Suitable differentials (not shown) of ordinary or special construction may be employed between the axles and wheels, if desired. It is to be noted that should the tractor be on a hill, and should the power fail, so that the tractor would have a tendency to run down hill, the worms 14 in engaging the worm wheels 11 will prevent the wheels from rotating, and in this manner, the tractor will be held at a standstill unless the shafts are rotated. To steer the tractor, the hand wheel 32 is rotated for rotating the shaft 27, and the worm 30 in engaging the worm wheel 31 will rotate the shaft 24. The cables 26 at one side will be wound upon the shaft 24, while the cables at the other side will be unwound from said shaft 24, and this will swing the frames 2 and 3 relative to the frame, for conveniently steering the machine. Both frames 2 and 3 are swung toward the same side with respect to the frame 1, whereby the machine may turn a comparatively short corner without inconvenience, and the worm 30 in engaging the worm wheel 31 will prevent the frames 2 and 3 from swinging accidentally, since the shaft 24 cannot rotate without the shaft 27 being employed for that purpose. Even when the machine is being steered, there is no interruption in the transmission of power to the front and rear wheels, since the shafts 12 may swing relative to the central shaft 16, when the frames 2 and 3 are swung relative to the frame 1, the universal joints 15 being in alinement with the axes of the hinges between the frames for that purpose.

From the foregoing, taken in connection with the drawings, the advantages and capabilities of the present invention will be apparent to those skilled in the art, and it will be understood that the machine may be provided with various essential features, such as are commonly employed in tractors and motor vehicles, to enable the machine to be properly driven and operated.

Having thus described the invention, what is claimed as new is:—

1. In a tractor, a central frame, end frames hinged thereto, ground wheels connected to the end frames, a shaft carried by each frame, the shafts being connected by universal joints lying in the axes of the hinges, and means for swinging the end frames relative to the central frame, the shafts of the end frames being operatively connected to the wheels.

2. In a tractor, a central frame, end frames hinged thereto, an axle journaled to each end frame, a pair of wheels carried by each axle, a worm wheel carried by each axle between the respective wheels, a shaft carried by each frame, the shafts being connected by universal joints lying in the axes of the hinges, a worm carried by the shaft of each end frame and intermeshing with the respective worm wheel, and means for swinging the end frames relative to the central frame.

3. In a tractor, a central frame, end frames hinged thereto, ground wheels connected to the end frames, a shaft carried by each frame, the shafts being connected by universal joints lying in the axes of the hinges, the shafts of the end frames being operatively connected to the wheels, a transverse shaft carried by the central frame, means for rotating the same, and pairs of cables attached to the end frames and wound upon the last mentioned shaft.

In testimony that I claim the foregoing as my own, I have hereto affixed my signature in the presence of two witnesses.

OTTO ALBERTUS.

Witnesses:
PAUL L. BROWN,
F. S. BROWN.